US009971052B2

(12) United States Patent
De Jong et al.

(10) Patent No.: US 9,971,052 B2
(45) Date of Patent: May 15, 2018

(54) SENSOR FOR DETECTING PRESSURE WAVES IN A LIQUID (71) Applicant: FUGRO TECHNOLOGY B.V., Leidschendam (NL)

(72) Inventors: Wim De Jong, Leidschendam (NL); Bastiaan Meulblok, The Hague (NL); Devrez Mehmet Karabacak, Leidschendam (NL); German Enrique Knoppers, The Hague (NL); Rudy Van Beelen, The Hague (NL)

(73) Assignee: FUGRO TECHNOLOGY B.V., Leidschendam (NL)

( * ) Notice: Subject to any disclaimer, the term of this patent is extended or adjusted under 35 U.S.C. 154(b) by 33 days.

(21) Appl. No.: 14/911,574

(22) PCT Filed: Aug. 15, 2014

(86) PCT No.: PCT/NL2014/000024
§ 371 (c)(1),
(2) Date: Feb. 11, 2016

(87) PCT Pub. No.: WO2015/023176
PCT Pub. Date: Feb. 19, 2015

(65) Prior Publication Data
US 2016/0187515 A1    Jun. 30, 2016

(30) Foreign Application Priority Data
Aug. 16, 2013    (NL) .................................... 1040338

(51) Int. Cl.
*G01L 1/24*    (2006.01)
*G01H 9/00*    (2006.01)
(Continued)

(52) U.S. Cl.
CPC ............... *G01V 1/38* (2013.01); *G01H 9/004* (2013.01); *G01L 1/246* (2013.01); *G01L 9/0039* (2013.01);
(Continued)

(58) Field of Classification Search
CPC ....................................................... G01L 1/246
See application file for complete search history.

(56) References Cited

U.S. PATENT DOCUMENTS 6,256,090 B1    7/2001    Chen et al.
8,402,834 B1    3/2013    Moslehi et al.
(Continued)

FOREIGN PATENT DOCUMENTS

WO    2010136724 A1    12/2010

OTHER PUBLICATIONS

The International Search Report and Written Opinion in related PCT/NL2014/000024, dated Oct. 1, 2014.

*Primary Examiner* — Jerry Rahll
(74) *Attorney, Agent, or Firm* — Troutman Sanders LLP; Ryan Schneider (57) ABSTRACT

An optical pressure sensor device (1) comprises: —a chamber (2) filled with pressure transfer medium and having at least one window (4) transparent to pressure waves; —an optical fiber (7) with a Fiber Bragg Grating (8); —a first pressure-sensitive mounting assembly (100) arranged within the chamber, holding the optical fiber; —a second pressure-sensitive mounting assembly (200) arranged within the chamber, holding the optical fiber. —The first pressure-sensitive mounting assembly, the second pressure-sensitive mounting assembly, and a static pressure compensation assembly (300) comprise pairs of bellows arranged on opposite sides of the fiber (7). —The bellows (310, 320) of the static pressure compensation assembly have their interior
(Continued)

in fluid communication with the pressure transfer medium in the chamber via a choke channel (314, 324), and have very low static stiffness.

40 Claims, 6 Drawing Sheets (51) Int. Cl.
  *G01L 11/02* (2006.01)
  *G01V 1/38* (2006.01)
  *G01V 1/18* (2006.01)
  *G01V 8/02* (2006.01)
  *G01L 9/00* (2006.01)
(52) U.S. Cl.
  CPC ............ *G01L 11/025* (2013.01); *G01V 1/187* (2013.01); *G01V 8/02* (2013.01); *G01V 2210/1423* (2013.01)

(56) References Cited

U.S. PATENT DOCUMENTS

| | | |
|---|---|---|
| 2002/0154860 A1 | 10/2002 | Fernald et al. |
| 2006/0163456 A1 | 7/2006 | Wittrisch et al. |

SENSOR FOR DETECTING PRESSURE WAVES IN A LIQUID

CROSS-REFERENCE TO RELATED APPLICATIONS

This application is a US National Stage of International Application No. PCT/NL2014/000024 filed 15 Aug. 2014, which claims the benefit of NL 1040338 filed 16 Aug. 2013, each herein fully incorporated by reference.

FIELD OF THE INVENTION

The present invention relates in general to a sensor for detecting pressure waves in a fluid, particularly a liquid.

BACKGROUND OF THE INVENTION

In the following description, terminology is used in the broadest sense. Particularly:
the term "sea" is used to indicate any suitable body of water, whether by name it would be indicated as sea or ocean, or even river or canal;
the term "ship" is used to indicate any suitable towing device travelling in the sea or on the sea surface, irrespective of its propulsion system, irrespective of its control system, and irrespective of the presence of a crew.

In the art of reflection seismology, acoustic pulses are generated at the upper regions of a sea (depth of about 5 to about 100 meters), and reflected acoustic signals are measured and analysed. This technology is useful, for instance, for mapping the sea floor and for exploring for oil and gas, in which case the structure below the floor surface is to be mapped.

The acoustic waves travel in the water as pressure waves, and are detected by pressure sensors. In a practical setup, a large plurality of sensors is arranged along the length of a cable of several kilometers long, with a mutual distance in the order of a few meters. The cable is towed in the water behind a ship; such towed cable is also indicated as "streamer". Measuring signals from the sensors travel along the streamer to a processing apparatus, which may or may not be located aboard the ship. In practice, the ship will be towing a plurality of such streamers parallel to each other, at a mutual distance in the order of about 50 meters. So all in all, a measuring array of many thousands of pressure sensors will be in operation.

In a typical prior art example, the pressure sensor is implemented as a piezo element, which comprises a piezo crystal. Pressure variations cause the piezo crystal to contract or expand, which in turn causes the piezo crystal to generate electrical signals. In such case, for transporting these electrical signals, a streamer needs to contain electrically conductive lines, which are typically made of copper, but which may alternatively be made of aluminium. In order to keep signal losses low, the conductive lines must be relatively thick. Alternatively, or additionally, such streamers need to include data acquisition units for combining and multiplexing or digitising the sensor signals. The same applies to other types of streamers, where the pressure sensors generate electrical signals.

It has already been proposed to replace the electrical signals by optical signals. This would allow the copper signal lines to be replaced by optical fibres. Instead of active sensors, which themselves generate optical signals, passive sensors have been proposed. With the phrase "passive" in this context is meant that an optical property of such sensor varies in response to variations in an ambient parameter, which optical property can be measured by interrogating the sensor with light. A passive optical element that has proven itself in this respect is a so-called Fibre Bragg Grating (FBG) reflector.

An FBG reflector consists of an optical fibre wherein, at some location, a series of material modifications is arranged lengthwise in the fibre. Normally, the optical properties of an optical fibre are constant along the length, which optical properties include the refractive index. Such material modification, however, has a slightly different refractive index. A plurality of such material modifications, at mutually the same distance, behaves as a grating, which typically is reflective for a small wavelength band. If a light pulse is made to enter the fibre, substantially all wavelengths will pass the grating location but light within said small wavelength band will be reflected. At the input end of the fibre, a reflected light pulse will be received, of which the wavelength is indicative for the mutual distance between the successive material modifications.

Such FBG reflector sensor is typically sensitive to (local) strain. Variations in strain cause variations in length of the fibre, including variations in distance between the successive material modifications of the Bragg grating. This, in turn, translates to variations in the wavelength of the reflected light.

It is noted that FBG reflectors are known per se, and that the use of FBG reflectors in streamers is known per se. Reference in this respect is made to, for instance, US patent applications 2011/0096624 and 2012/0069703. Since furthermore the present invention is not directed to providing an improved optical fibre or an improved FBG, while the present invention can be implemented using optical fibres with FBG reflectors of the same type as currently are being deployed, a more detailed explanation of design and manufacture of optical fibres with FBG reflectors is omitted here.

The acoustic waves to be sensed are pressure waves in the sea water. Since the FBG reflectors are mainly sensitive to longitudinal strain variations, a pressure sensor having an FBG reflector as sensitive element needs to have means for translating ambient pressure variations to fibre strain variations.

SUMMARY OF THE INVENTION

The present invention aims to provide a pressure sensor device having an FBG reflector as sensing element, that is suitable to be used for measuring water pressure waves in a streamer for use in marine surveying and exploration. It is to be noted, however, that such pressure sensor device may also be useful in other applications.

The pressure sensor device should meet certain conditions that relate to application in a streamer. In view of the general design and size of a streamer, the pressure sensor device should have a cross section as small as possible, preferably less than a few cm. For a good measuring result, the pressure sensor device should be as sensitive as possible to the acoustic pressure signal, i.e. pressure variations within a frequency range of 1 Hz to several tens of kHz, it being noted that the frequency range of interest depends on the actual application. On the other hand, a streamer may be used close to the sea surface but also at a depth of for instance 40 m or more, while other applications for the sensor will require a usability at substantially larger depths, therefore the pressure sensor device should be sensitive to very small pressure variations superimposed on a static background pressure that may vary in a range from 0 to perhaps 10 bar(gauge) or more. Further, with a streamer being towed through the water, vibrations and noise are generated in the streamer, and the pressure sensor device should preferably have low sensitivity to disturbances of this type.

Further, the pressure sensor device should be robust. Marine surveying is an operation that is preferably executed almost continuously over time periods of many months, and the streamers should operate properly without the need for maintenance or repair over such time periods. Further, in use, the sensors need to be able to withstand the "handling", i.e. the deployment and retrieval of the streamers. Further, in the transport process from manufacturer to final destination, the pressure sensor device should be capable to withstand temperature in range from about −40° C. to about +60° C.

Further, the pressure sensor device should be small. Application in a streamer means that there is only limited space available to the pressure sensor device, and this applies particularly to the cross section. US patent application 2004/0184352 discloses a design where a fibre is wound tight on a hollow mandrel, wherein pressure variations cause variations in the mandrel diameter and consequently in the fibre length, but such design has several drawbacks. One drawback relates to the fact that winding the fibre obviously makes it necessary to bend the fibre. However, the radius of curvature of the bend should not be lower than a certain minimum, which puts a minimum to the diameter of the mandrel, which in turn translates to a relatively large diameter of the streamer. For a streamer, it is however desirable to reduce the diameter as much as possible, because that would result in less material, less weight, less drag, and lower operational costs. Further, in the design of US 2004/0184352, the operation relies on changing the length of the fibre between FBG sensing elements, due to excitation with acoustic waves. But the length of the fibre also changes due to mechanically induced excitations, due to variations of strain in the cable. The strain in the cable varies because of "jerk" stresses and swell waves. This causes background noise.

Further, in the design of US 2004/0184352, the operation relies on the fact that, when a hollow mandrel is subjected to an increase of outside pressure, its internal volume decreases in proportion to the pressure increase. The optimum response is achieved if the axial length of the mandrel does not change, but even then the response of the change in circumference, which is proportional to the change in length of the fibre, is only proportional to the square root of the change in pressure. Further, for a fibre to follow such decrease in length up to the highest pressure to be expected makes it necessary that the fibre is wound around the mandrel in a highly strained condition.

In the design presented by the present invention, the operation is primarily based on increasing the length of the FBG sensing element when the pressure is increased. An FBG sensing element is relatively short and embodiments are possible wherein the FBG sensing element is mechanically isolated such that it is insensitive to strain in the cable. The highest strain in the fibre is to be expected at the deepest underwater position i.e. at the highest pressure condition.

In one aspect, the present invention relates to an optical pressure sensor device comprising:
  a chamber filled with a pressure transfer medium, preferably oil, the chamber being suitable for immersion in a fluid and having at least one window that is at least partly transparent to pressure waves in such fluid;
  an optical fibre extending longitudinally through the chamber, the optical fibre comprising a Fibre Bragg Grating;
  a frame having a first frame end and a longitudinally opposite second frame end;
  at least one first pressure-sensitive mounting assembly arranged within the chamber and fixed to the first frame end, the first pressure-sensitive mounting assembly having a first fibre mount displaceable in the longitudinal direction of the fibre, the first pressure-sensitive mounting assembly further comprising at least one axial pressure response element interposed between the first fibre mount and the first frame end, adjacent the fibre.

The optical fibre is fixed to the first fibre mount at one fixing point at one side of the Fibre Bragg Grating. At least in normal operation, the first fibre mount is exerting on the optical fibre a pulling force towards said first frame end, the pulling force being variable with variations in the pressure of said pressure transfer medium such that an increase in pressure effects an increase in pulling force.

The optical fibre may be fixed to a second frame end opposite the first frame end, at a second fixing point at an opposite side of the Fibre Bragg Grating with respect to the first fixing point.

In a particular embodiment, the optical pressure sensor device further comprises
  a second pressure-sensitive mounting assembly arranged within the chamber and fixed to the second frame end, the second pressure-sensitive mounting assembly having a second fibre mount displaceable in the longitudinal direction of the fibre, the second pressure-sensitive mounting assembly further comprising at least one axial pressure response element interposed between the second fibre mount and the second frame end, adjacent the fibre.

The optical fibre is fixed to the second fibre mount at a second fixing point at an opposite side of the Fibre Bragg Grating with respect to the first fixing point. At least in normal operation, the second fibre mount is exerting on the optical fibre a second pulling force towards said second frame end, the second pulling force being variable with variations in the pressure of said pressure transfer medium such that an increase in pressure effects an increase in second pulling force.

In another particular embodiment, the optical pressure sensor device further comprises
  at least one static pressure compensation assembly arranged within the chamber and fixed to the second frame end, the static pressure compensation assembly having a second fibre mount displaceable in the longitudinal direction of the fibre, the static pressure compensation assembly further comprising at least one axial pressure compensation element interposed between the second fibre mount and the second frame end, adjacent the fibre.

The optical fibre is fixed to the second fibre mount at a second fixing point at an opposite side of the Fibre Bragg Grating with respect to the first fixing point. The axial stiffness of the axial pressure compensation element is a function of the pressure of said pressure transfer medium such that the stiffness is high for high-frequency pressure variations and lower for low-frequency pressure variations and for static pressure conditions.

In yet another particular embodiment, the optical pressure sensor device further comprises.

a static pressure compensation assembly arranged within the chamber and fixed to the second frame end, the static pressure compensation assembly comprising at least one axial pressure compensation element arranged adjacent the fibre;

a second pressure-sensitive mounting assembly arranged within the chamber and fixed to the static pressure compensation assembly, the second pressure-sensitive mounting assembly having a second fibre mount displaceable in the longitudinal direction of the fibre, the second pressure-sensitive mounting assembly further comprising at least one axial pressure response element interposed between the second fibre mount and the static pressure compensation assembly, adjacent the fibre.

The optical fibre is fixed to the second fibre mount at a second fixing point at an opposite side of the Fibre Bragg Grating with respect to the first fixing point. At least in normal operation, the second fibre mount is exerting on the optical fibre a second pulling force towards said second frame end, the second pulling force being variable with variations in the pressure of said pressure transfer medium such that an increase in pressure effects an increase in second pulling force. The axial stiffness of the axial pressure compensation element is a function of the pressure of said pressure transfer medium such that the stiffness is high for high-frequency pressure variations and lower for low-frequency pressure variations and for static pressure conditions.

The optical pressure sensor device may further comprise an intermediate mount, having one end fixed to the axial pressure compensation elements of the static pressure compensation assembly and having its opposite end fixed to the second pressure response elements of the second pressure-sensitive mounting assembly, the intermediate mount further having a passage allowing the fibre to pass without touching the intermediate mount.

In yet another particular embodiment, the optical pressure sensor device further comprises a second pressure-sensitive mounting assembly arranged within the chamber and fixed to the second frame end, the second pressure-sensitive mounting assembly comprising at least one axial pressure response element arranged adjacent the fibre;

a static pressure compensation assembly arranged within the chamber and fixed to the second pressure-sensitive mounting assembly, the static pressure compensation assembly having a second fibre mount displaceable in the longitudinal direction of the fibre, the static pressure compensation assembly further comprising at least one axial pressure compensation element interposed between the second fibre mount and the second pressure-sensitive mounting assembly, adjacent the fibre;

The optical fibre is fixed to the second fibre mount at a second fixing point at an opposite side of the Fibre Bragg Grating with respect to the first fixing point. At least in normal operation, the second fibre mount is exerting on the static pressure compensation assembly a second pulling force towards said second frame end, the second pulling force being variable with variations in the pressure of said pressure transfer medium such that an increase in pressure effects an increase in second pulling force. The axial stiffness of the axial pressure compensation element is a function of the pressure of said pressure transfer medium such that the stiffness is high for high-frequency pressure variations and lower for low-frequency pressure variations and for static pressure conditions.

The optical pressure sensor device may further comprise an intermediate mount, having one end fixed to the axial pressure compensation elements of the static pressure compensation assembly and having its opposite end fixed to the second pressure response elements of the second pressure-sensitive mounting assembly, the intermediate mount further having a passage allowing the fibre to pass without touching the intermediate mount.

In a possible embodiment, the optical pressure sensor device further comprises a static pressure compensation assembly interposed between the first frame end and the first pressure-sensitive mounting assembly.

In a possible embodiment, pressure response elements are implemented as bellows.

In a possible embodiment, pressure compensation elements are implemented as bellows.

In a possible embodiment, the fibre has a stiffness $Kf$; the first pressure response elements have stiffnesses $K1$ smaller than $Kf$; and the pressure compensation elements have static stiffnesses $K3$ smaller than $K1$.

In a possible embodiment, the fibre has a stiffness $Kf$; the first and second pressure response elements have respective stiffnesses $K1$ and $K2$ smaller than $Kf$; and the pressure compensation elements have static stiffnesses $K3$ smaller than $K1$ and $K2$.

In a possible embodiment, said window is implemented as a membrane.

In a possible embodiment, pressure response elements have mutually the same size and design, so that they have mutually the same physical properties.

In a possible embodiment, pressure compensation elements have mutually the same size and design, so that they have mutually the same physical properties.

In another aspect, the present invention relates to a streamer section for seismic exploration, comprising at least one optical pressure sensor device.

In another aspect, the present invention relates to a streamer for seismic exploration, comprising at least one optical pressure sensor device.

In another aspect, the present invention relates to a streamer array for seismic exploration, comprising at least one optical pressure sensor device.

In another aspect, the present invention relates to a seismic exploration system. The system comprises at least one streamer or a streamer array, a ship for towing the streamer or the streamer array, respectively, and a processing apparatus for receiving and processing measuring signals from the sensors.

In yet another aspect, the present invention relates to a cable intended for being laid on a sea floor, for subsea pressure monitoring of submarine acoustic detection, the cable comprising at least one optical pressure sensor device.

In yet another aspect, the present invention relates to a microphone, comprising at least one optical pressure sensor device.

In yet another aspect, the present invention relates to a pressure-sensitive mounting assembly for an optical pressure sensor device. The pressure-sensitive mounting assembly comprises a moveable fibre mount having a connection point for connecting to a fibre, and at least one axial pressure response element for coupling the fibre mount to a frame end such that the fibre mount is displaceable in an axial direction. Each axial pressure response element has one axial end for connecting to said frame end and has an opposite axial end connected to said fibre mount adjacent said connection point. In each axial pressure response element, the axial dimension is responsive to changes in ambient pressure in that an increase in ambient pressure effects a decrease of the axial distance between said axial ends.

In a possible embodiment, each axial pressure response element comprises a closed container.

In a possible embodiment, each axial pressure response element comprises a bellows.

In a possible embodiment, the pressure-sensitive mounting assembly comprises two axial pressure response elements arranged at opposite sides of said connection point.

In yet another aspect, the present invention relates to a static pressure compensation assembly for an optical pressure sensor device. The static pressure compensation assembly comprises a moveable base and at least one axial pressure compensation element for coupling the base to a frame end such that the base is displaceable in an axial direction. The axial stiffness of the axial pressure compensation element is a function of the ambient pressure such that the stiffness is high for high-frequency pressure variations and lower for low-frequency pressure variations and for static pressure conditions.

In a possible embodiment, each axial pressure compensation element comprises a bellows having its interior in fluid communication with the ambient via a choke channel. Said choke channels have a relatively high flow resistance for ambient fluid.

In a possible embodiment, each choke channel has a time constant in the order of about 1 second to 10 minutes. In a preferred embodiment, each choke channel has a time constant in the order of 1 minute.

In yet another aspect, the present invention relates to a method for seismic exploration of a sea floor. The method comprises the steps of providing at least one optical pressure sensor, arranging the sensor in the sea, generating at least one acoustic pulse in an upper region of the sea, detecting acoustic response signals from said sea floor using said optical pressure sensor, and processing the measuring signals from said optical pressure sensor.

In a possible embodiment, a plurality of optical pressure sensors are arranged in a streamer, and the streamer is arranged in the sea and towed by a ship.

In a possible embodiment, an array of multiple streamers is arranged in the sea and towed by the ship.

In yet another aspect, the present invention relates to a method of detecting pressure variations in a fluid. The method comprising the steps of providing an optical fibre comprising a Fibre Bragg Grating, holding the optical fibre at two fixing points on opposite sides of said Fibre Bragg Grating, and exerting on the optical fibre a tension force pulling said two fixing points apart. A fluid pressure variation is received. In response to receiving a fluid pressure increase, said tension force is increased, and in response to receiving a fluid pressure decrease, said tension force is decreased. The optical fibre is interrogated with a light pulse, and a reflected light pulse is received from said Fibre Bragg Grating. The wavelength spectrum of the reflected light pulse is analysed to calculate a length variation of the Fibre Bragg Grating proportional to a wavelength shift of the reflected light pulse as compared to the interrogating light pulse, and a pressure variation proportional to said length variation is calculated.

In a possible embodiment, a compensation for static pressure variations is effected by filtering the fluid pressure variations and reducing the tension force response variation for fluid pressure variations having a variation frequency lower than a predefined frequency threshold.

In yet another aspect, the present invention relates to a detection means for detecting pressure variations in a fluid. The detection means comprise an optical fibre comprising a Fibre Bragg Grating, and mounting means for holding the optical fibre at two fixing points on opposite sides of said Fibre Bragg Grating, and for exerting on the optical fibre a tension force pulling said two fixing points apart. Said mounting means include at least one pressure-sensitive response element for receiving a fluid pressure variation and for, in response to receiving a fluid pressure increase, increasing said tension force, and in response to receiving a fluid pressure decrease, decreasing said tension force.

In a possible embodiment, the detection means further comprise compensation means for reducing the tension force response variation for fluid pressure variations having a variation frequency lower than a predefined frequency threshold.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
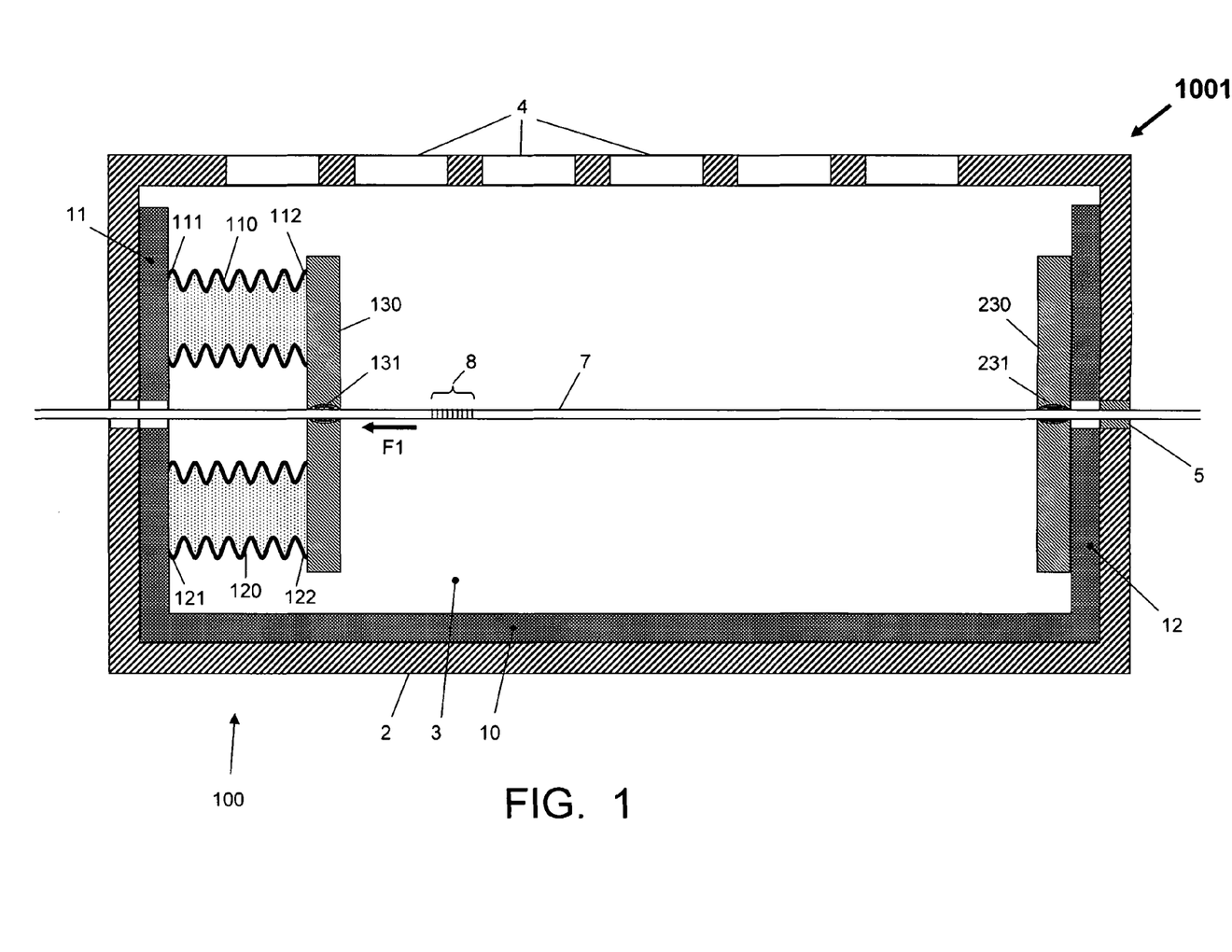
FIG. 1 is a diagram schematically illustrating the design of an exemplary optical pressure sensor device useful in the present invention.

FIG. 1 is a diagram schematically illustrating the design of an exemplary optical pressure sensor device 1001 according to the present invention. The pressure sensor device 1001 comprises a chamber 2 having its interior filled with a pressure transfer medium 3. The chamber 2 is designed such as to allow ambient pressure to reach the pressure transfer medium, the design depending on the circumstances.

In an exemplary embodiment, the pressure transfer medium is a gas. In an other exemplary embodiment, the pressure transfer medium is a liquid. In yet another exemplary embodiment, the pressure transfer medium is a gel. In yet another exemplary embodiment, the pressure transfer medium is a silicone material with pressure transfer properties similar to the properties of a liquid. In yet another exemplary embodiment, the pressure transfer medium is a rubber material with pressure transfer properties similar to the properties of a liquid. In yet another exemplary embodiment, the pressure transfer medium is a mixture of any of the above-mentioned materials. In a preferred embodiment, this pressure transfer medium may advantageously be an oil.

Depending on the application, the pressure transfer medium may be identical to the ambient medium. In such case, the chamber 2 may be in open communication with the ambient surroundings. In case the pressure transfer medium differs from the ambient medium, and/or in cases where it is undesired that ambient medium enters the chamber 2, the chamber 2 may be sealed, as shown. Although sealed, the chamber 2 has at least one window 4 that is at least partly transparent to pressure waves so that, when immersed in an ambient fluid, the liquid pressure of the pressure transfer medium 3 in the chamber 2 will be substantially identical to the ambient pressure, or will in any case be proportional thereto. For instance, the window 4 may be implemented as a membrane.

For practical applications, the ambient fluid may typically be a liquid. For marine applications, this liquid will typically be water, more particularly sea water. Nevertheless, the sensor of the present invention can also be used in a gaseous environment, for instance air. Hereinafter, for sake of simplicity, the ambient fluid will simply be indicated as "water".

Within the chamber 2, an elongate frame 10 is arranged, fixed to the chamber 2. As shown the frame 10 may have a rectangular shape, with a first longitudinal frame end 11 and a second longitudinal frame end 12.

At the interior side of the first frame end 11, a first pressure-sensitive mounting assembly 100 is fixed. The first pressure-sensitive mounting assembly 100 comprises a first fibre mount 130. A second fibre mount 230 is arranged at the interior side of the opposite second frame end 12. An optical fibre 7 extends through the chamber 2, parallel to the longitudinal direction of the frame 10, and is fixed to the first fibre mount 130 and to the second fibre mount 230, for instance by a suitable glue, as indicated at 131 and 231, respectively. In the stretch of fibre between the two mounting locations, the optical fibre 7 comprises a Fibre Bragg Grating 8.

It can be seen that the fibre 7 extends through small holes in the walls of the chamber 2. In these holes, a sealant 5 is preferably applied for preventing leakage of the pressure transfer medium 3.

The second fibre mount 230 is fixed with respect to the second frame end 12. Alternatively, the optical fibre 7 may be directly attached to the second frame end 12, in which case the second fibre mount 230 can be omitted.

The first pressure-sensitive mounting assembly 100 comprises at least one axial pressure response element 110, 120 interposed between the first fibre mount 130 and the first frame end 11, and having its longitudinal axis parallel to the fibre 7. While the essence of the present invention can be practiced with a single axial pressure response element, in the embodiment shown two such axial pressure response elements 110, 120 are arranged on opposite sides of the fibre 7. Each axial pressure response element 110, 120 has a respective first end 111, 121 attached to the first frame end 11, and an opposite second end 112, 122 attached to the first fibre mount 130. The two axial pressure response elements 110, 120 preferably have mutually the same size and design, so that they have mutually the same physical properties. The most relevant physical property of the axial pressure response element 110, 120 in this context is the response to changes in outside pressure: when the outside pressure, i.e. the pressure of pressure transfer medium 3, increases, the axial pressure response element 110, 120 undergoes an elastic decrease in axial length substantially proportional to the pressure change.

There may be three or even more axial pressure response elements arranged around the fibre 7, preferably arranged at equidistant intervals. However, the embodiment with two elements arranged at 180° with respect to the fibre, so that the longitudinal axes of the elements and the longitudinal axis of the fibre extend in one common virtual plane, has the advantage that the transverse dimension of the sensor device 1001 as measured perpendicular to that plane can be kept small.

For implementing the axial pressure response element 110, 120, several designs will be possible. One possible embodiment is a bellows, preferably made of metal, and FIG. 1 illustratively shows the bellows embodiment, indeed. By way of example, another possible embodiment could be a piston provided with a counter-acting spring. Other examples of possible embodiments are membranes, bourdon springs.

By way of example, a metal bellows can be made by electro-deposition of metal on a mandrel, and then removing the mandrel material (for instance thermally or chemically) such that the metal bellows remain. The choice of bellows material, bellows length and diameter, and pitch and depth of the bellows undulations are parameters in the bellows design, as will be appreciated by a person skilled in the art, to obtain desired bellows properties, especially stiffness. It remains to be noted that the bellows do not necessarily have a circular cross sectional contour.

The first bellows 110, 120 are sealed. They may be vacuum, or filled with a compressible medium, preferably a gas, for instance air, at ambient pressure or at a pressure higher or lower than ambient. These first bellows 110, 120 are sensitive to pressure variations in the pressure transfer medium 3. If the pressure transfer medium pressure increases, the first bellows 110, 120 are compressed so that the first fibre mount 130 is moved towards the first frame end 11. Thus, a first pulling force F1 is exerted on the fibre 7, directed away from the FBG 8 (to the left in the drawing). Of course, an equal but opposite reaction force is exerted on the fibre by the second fibre mount 230, but this is not shown for sake of convenience. It is noted that the first pulling force F1 is in line with the fibre 7; consequently, at all times, irrespective of the magnitude of the pulling force F1, bending of the strained fibre is avoided and the fibre 7 remains straight at the location of the FBG 8. It is further noted that the first fibre mount 130 is supported by both first bellows 110, 120, which compress or expand at substantially the same rate, so that the first fibre mount 130 is displaced without tilting and thus without bending the fibre 7. Thus, an increase/decrease of pressure, such as caused by an acoustic pressure wave, causes a proportional increase/decrease of length of the FBG 8.

In the case of unexpectedly high pressure shocks, the axial pressure response element 110, 120 may get damaged by plastic deformation. In order to prevent this, the optical pressure sensor device 1001 may comprise end stops for limiting the axial displacement freedom of the first fibre mount 130, but this is not shown for sake of simplicity.

Figure 2:
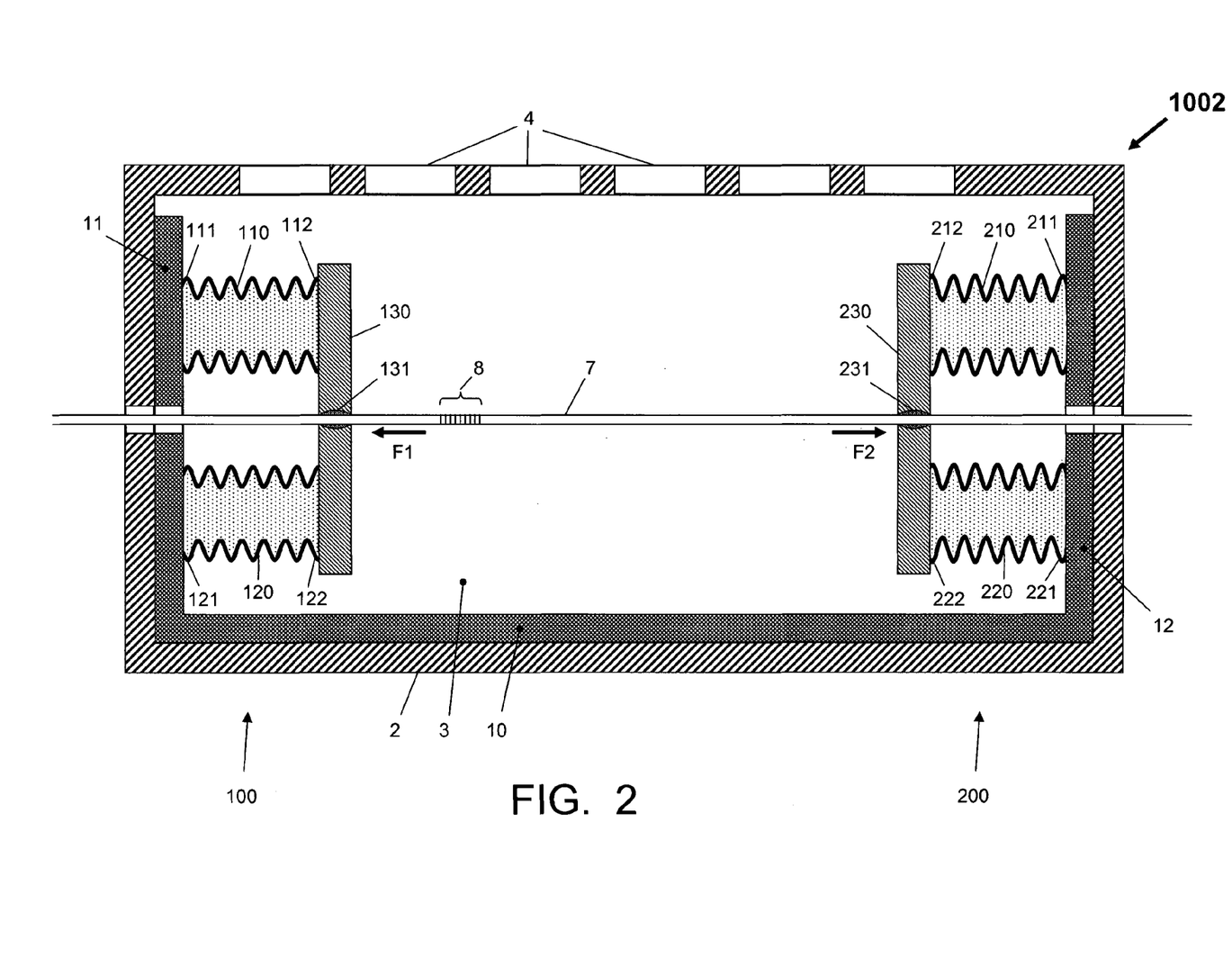
FIG. 2 is a diagram schematically illustrating the design of a second embodiment of an optical pressure sensor device useful in the present invention.

FIG. 2 is a diagram schematically illustrating the design of a second exemplary embodiment of an optical pressure sensor device 1002 according to the present invention. As compared to the first embodiment of FIG. 1, this second embodiment differs by the presence of a second set of axial pressure response elements 210, 220 interposed between the second fibre mount 230 and the second frame end 12. Similar as in the case of the first pressure-sensitive mounting assembly 100, the second pressure response elements 210, 220 each have a respective first end 211, 221 attached to the second frame end 12, and an opposite second end 212, 222 attached to the second fibre mount 230. These second pressure response elements 210, 220 together with the second fibre mount 230 form a second pressure-sensitive mounting assembly 200. All statements made in the above with respect to the first pressure-sensitive mounting assembly 100 also apply, mutatis mutandis, to the second pressure-sensitive mounting assembly 200. The second pressure-sensitive mounting assembly 200 and the first pressure-sensitive mounting assembly 100 preferably are mutually identical, but that is not essential.

If the pressure transfer medium pressure increases, the second pressure response elements 210, 220 of the second pressure-sensitive mounting assembly 200 are compressed so that the second fibre mount 230 is moved towards the second frame end 12. Thus, a second pulling force F2 is exerted on the fibre 7, directed away from the FBG 8 (to the right in the drawing). As compared to the first embodiment 1001, the length variation of the fibre 7 in response to a pressure variation may in the second embodiment 1002 be higher since both fibre mounts are moving in opposite directions. This means that the pressure sensitivity has increased without the necessity to increase the transverse dimensions of the pressure-sensitive elements. A further advantage of this embodiment is increased insentitivity to axial vibrations.

Figure 3:
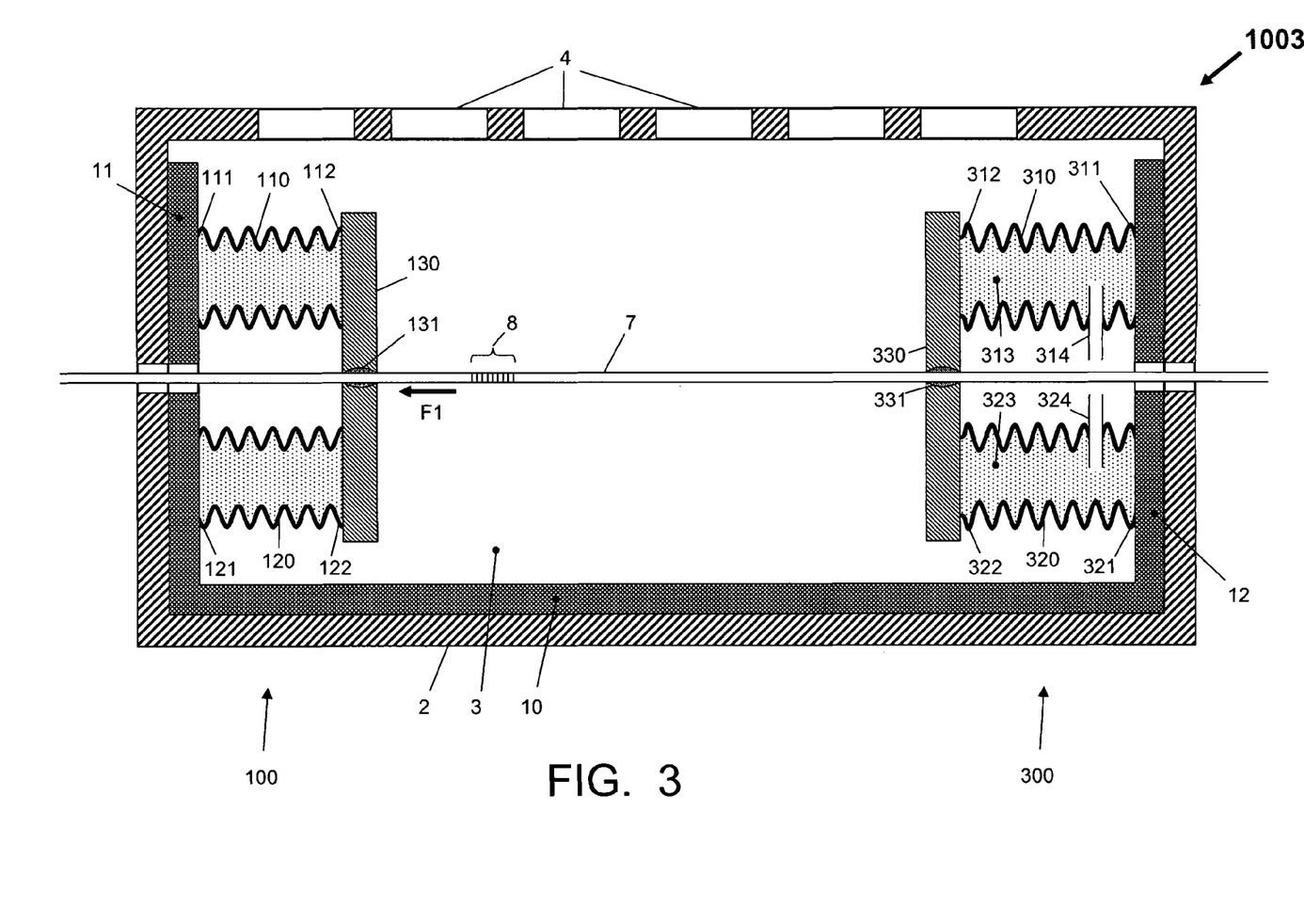
FIG. 3 is a diagram schematically illustrating the design of a third embodiment of an optical pressure sensor device useful in the present invention.

FIG. 3 is a diagram schematically illustrating the design of a third exemplary embodiment of an optical pressure sensor device 1003 according to the present invention. As compared to the first embodiment of FIG. 1, this third embodiment differs by the presence of a static pressure compensation assembly 300 arranged opposite the first pressure-sensitive mounting assembly 100. The static pressure compensation assembly 300 also comprises a fibre mount, here indicated as third fibre mount, which is indicated by reference numeral 330 but otherwise performs the same function as the second fibre mount 230 described earlier. The third fibre mount 330 is attached to the fibre 7 at a mounting location indicated at 331.

The static pressure compensation assembly 300 comprises at least one axial pressure compensation element 310, 320 interposed between the third fibre mount 330 and the second frame end 12, and having its longitudinal axis parallel to the fibre 7. While the essence of the present invention can be practiced with a single axial pressure compensation element, in the embodiment shown two such axial pressure compensation elements 310, 320 are arranged on opposite sides of the fibre 7. Each axial pressure compensation element 310, 320 has a respective first end 311, 321 attached to the second frame end 12, and an opposite second end 312, 322 attached to the third fibre mount 330. The two axial pressure compensation elements 310, 320 preferably have mutually the same size and design, so that they have mutually the same physical properties.

For implementing the axial pressure compensation element 310, 320, several designs will be possible. One possible embodiment is a bellows, preferably made of metal, and FIG. 3 illustratively shows the bellows embodiment, indeed. By way of example, another possible embodiment could be a resilient member such as a spring provided with a velocity choke. In the context of the present invention, a velocity choke is a device giving resistance to a moving body, the resistance strongly increasing with rising speed of that body, so that the choke defines a relatively low maximum speed for the body. In the present invention, the choke is advantageously implemented as a fluid choke, which includes a restriction through which a fluid must pass, pressed by said moving body. As an exemplary alternative, the choke may be implemented as a piston reciproking in a tight-fitting channel.

At first sight, the design of the static pressure compensation assembly 300 implemented with bellows looks quite similar to the design of the second pressure-sensitive mounting assembly 200 of the second embodiment 1002. However, an important difference is that the bellows 310, 320 of the static pressure compensation assembly 300 have their respective interiors 313, 323 in fluid communication with the pressure transfer medium 3 in the chamber 2, via respective choke channels 314, 324 having a relatively high flow resistance allowing only a certain maximum flow speed. The design of the choke channel 314, 324 may be such as to have a time constant in the order of about 1 second to 10 minutes, preferably in the order of 1 minute.

The purpose of the static pressure compensation assembly 300 is to reduce the sensitivity of the pressure sensor device to static pressure variations such as those caused by changing the positional depth of the sensor device below the water surface. The operation can be briefly explained as follows.

For acoustic pressure variations in the pressure transfer medium 3 (caused by acoustic pressure variations in the ambient water), the choke channels 314, 324 may be considered closed and the pressure transfer medium content in the interiors 313, 323 of the third bellows 310, 320 is constant. With an incompressible pressure transfer medium, the third bellows 310, 320 may be considered as constituting a rigid connection between the third fibre mount 330 and the second frame end 12. This means that the third fibre mount 330 may be considered as being fixed to the frame 10, and that the sensor works in the same fashion as the first embodiment of FIG. 1.

For fast changes in pressure, such as occur in acoustic pressure variations, the first pressure-sensitive mounting assembly 100 will basically show the same response as for slow changes in pressure, such as occur when a streamer is brought to a higher depth. In both cases, a tension force F1 will be exerted on the fibre 7, which pulls the third fibre mount 330 and effectively reduces the pressure in the interiors 313, 323 of the third bellows 310, 320. For a slow change in pressure, however, the choke channels 314, 324 will allow pressure transfer medium 3 to flow into the third bellows 310, 320 to compensate for this reduced interior pressure, which allows the third fibre mount 330 to yield to the pulling force exerted by the fibre 7, thus effectively reducing the tension in the fibre 7.

Figure 4:
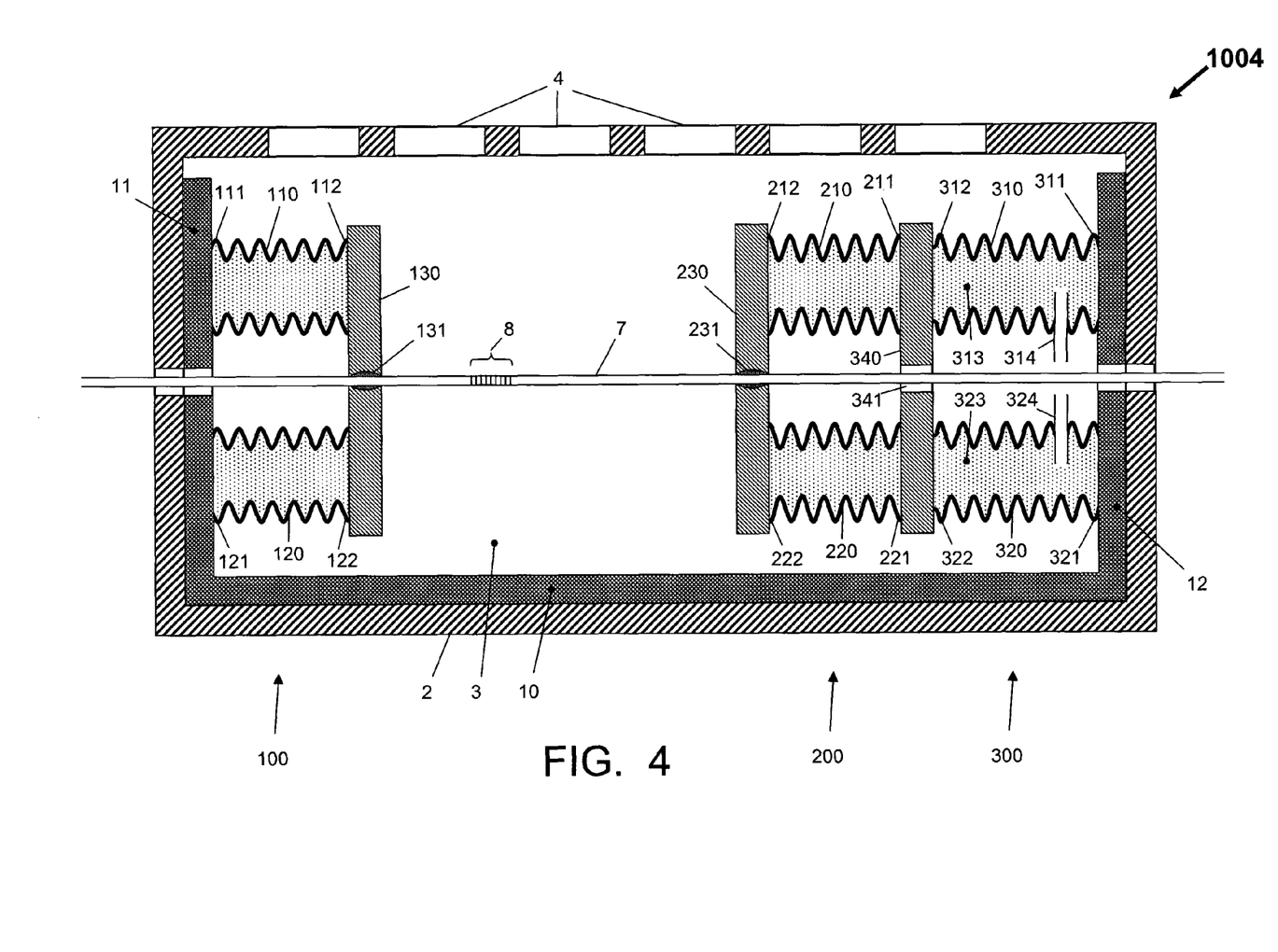
FIG. 4 is a diagram schematically illustrating the design of a fourth embodiment of an optical pressure sensor device useful in the present invention.

In the embodiment of FIG. 3, the functions of pressure sensing and pressure compensating are spatially separated in that the static pressure compensation assembly 300 is mounted opposite the first pressure-sensitive mounting assembly 100. Alternatively, it is possible to mount a static pressure compensation assembly and a pressure-sensitive mounting assembly to each other, in a stacked fashion. FIG. 4 is a diagram schematically illustrating the design of a fourth exemplary embodiment of an optical pressure sensor device 1004 according to the present invention. At the lefthand side of FIG. 4, the first pressure-sensitive mounting assembly 100 as described before can be recognized. At the righthand side, a stack can be recognized of a second pressure-sensitive mounting assembly 200 (as described with reference to FIG. 2) and a static pressure compensation assembly 300 (as described with reference to FIG. 3). The static pressure compensation assembly 300 is arranged between the second pressure-sensitive mounting assembly 200 and the second frame end 12. Alternatively, the second pressure-sensitive mounting assembly 200 may be arranged between the static pressure compensation assembly 300 and the second frame end 12, but the embodiment shown is preferred because of better vibration stability.

The axial pressure compensation elements 310, 320 of the static pressure compensation assembly 300 may be fixed to the second pressure response elements 210, 220 of the second pressure-sensitive mounting assembly 200 directly. In the embodiment shown, the stack comprises an intermediate mount 340, which preferably is plate-shaped, as shown, to which on the one hand the axial pressure compensation elements 310, 320 of the static pressure compensation assembly 300 are fixed and to which on the other hand the second pressure response elements 210, 220 of the second pressure-sensitive mounting assembly 200 are fixed. Such intermediate mount 340 provides increased stability. The intermediate mount 340 has a passage 341 for allowing the fibre 7 to pass without touching the intermediate mount 340.

In a further elaboration, a second static pressure compensation assembly may be combined with the first pressure-sensitive mounting assembly 100, in a similar fashion as the combination of the static pressure compensation assembly with the second pressure-sensitive mounting assembly 200. In such embodiment, which may be mirror-symmetric, the static pressure compensation effect will increase as compared to an embodiment having one static pressure compensation assembly.

In the following, the operation of the fourth embodiment 1004 will be discussed in more detail.

Assume that the fibre 7 has linear stiffness Kf (stiffness K being defined as $\Delta F/\Delta L$, with F indicating force, L indicating length, and $\Delta$ indicating increment)

Assume that each bellows has a cross section A (modifications if the cross section A1 of the first bellows is not equal to the cross section A2 of the second bellows should be clear to a person skilled in the art).

Assume that the first bellows 110, 120 have stiffness K1.

Assume that the second bellows 210, 220 have stiffness K2 (with preferably K2=K1).

Assume a static pressure P0 in the pressure transfer medium 3, a static strain on the fibre 7 and a static value $\lambda 0$ of the wavelength of reflected light from the FBG 8. Assume an acoustic pressure increase with amplitude $\Delta P$ in the pressure transfer medium 3. This will result in force increases $\Delta F = A \cdot \Delta P$ on each bellows.

Assume that the first fibre mount 130 is displaced over a distance $\Delta L1$. In that case, the first bellows 110, 120 each exert a counter force $\Delta F1 = K1 \cdot \Delta L1$.

Assume that the second fibre mount 230 is displaced over a distance $\Delta L2$. In that case, the second bellows 210, 220 each exert a counter force $\Delta F2 = K2 \cdot \Delta L2$.

Because the fibre 7 is attached to the fibre mounts, the fibre length will have increased by $\Delta L1 + \Delta L2$. In that case, the fibre 7 exerts a pulling force of $Ff = Kf \cdot (\Delta L1 + \Delta L2)$.

In equilibrium, the forces acting on the first fibre mount 130 will be mutually equal, and the same applies to the second fibre mount 230: $Kf \cdot (\Delta L1 + \Delta L2) + 2 \cdot (K1 \cdot \Delta L1) = 2A \cdot \Delta P = Kf \cdot (\Delta L1 + \Delta L2) + 2 \cdot (K2 \cdot \Delta L2)$. Thus, $K2 \cdot \Delta L2 = K1 \cdot \Delta L1$, hence $\Delta L2 = \Delta L1 \cdot K1/K2$ and $\Delta L1 = \Delta Lf \cdot K2/(K1+K2)$. Simplifying by assuming that K1=K2=K, it follows that $\Delta Lf = 2A \cdot \Delta P/(Kf+K)$.

This length variation $\Delta L$ of the fibre 7 will cause a shift $\Delta \lambda$ of the wavelength of reflected light.

With respect to the design of the bellows, it will be appreciated that lowering K1 and K2 will result in higher sensitivity of the sensor.

With respect to the design of the fiber, it will likewise be appreciated that lower Kf will result in higher sensitivity of the sensor. It is noted that Kf can be modified by a designer, since Kf is determined by the Youngs modulus of the fiber material, the fiber diameter, and the length of the fiber segment between the fiber fixation points 131 and 132. A standard diameter for glass fiber is 125 µm, but 40 µm is soon expected to be available. Increasing the fiber length, ceteris paribus, will indeed reduce Kf, but it will also reduce the strain in the FBG so this does not increase the sensitivity.

Without the static pressure compensation assembly 300, the same shift would occur in the case of a slowly changing static pressure from P0 to $P1 = P0 + \Delta P$, for instance because of the streamer being lowered in the water, and that would mean that the zero-value of the wavelength of reflected light would shift over a range larger than the normal measuring range, considering that the static pressure shift would be higher than the amplitude of the pressure signals to be measured. This is undesirable, since it would increase the bandwidth occupied by the measuring device, or, stated differently, would use a large part of a bandwidth allocated to the measuring device. depending on the depth at which the device is operated. The static pressure compensation assembly 300, to a large extent, compensates for this effect by reducing the static wavelength shift. To this end, the third bellows 310, 320 preferably have, for slow variations in pressure, a stiffness K3 lower than the stiffnesses K1 and K2 of the first and second bellows 110, 120 and 210, 220. This means that the bellows mount 330 is only weakly coupled to the frame 10.

The operation of this pressure compensation can be explained as follows.

Assume again a pressure change from P0 to P1. The first bellows 110, 120 will be compressed by a distance $\Delta L1$, the second bellows 210, 220 will be compressed by a distance $\Delta L2$. The length of fibre between the fibre mounts will expand by a distance $\Delta Lf$, and the third bellows 310, 320 will expand by a distance $\Delta L3 = \Delta L1 + \Delta L2 - \Delta Lf$. Hence $\Delta Lf = \Delta L1 + \Delta L2 - \Delta L3$.

In equilibrium, the compressed second bellows 210, 220 as a whole will be subjected to the pressure P1 inside the third bellows 310, 320, the force F3 from the expanded third bellows 310, 320, the pressure P1 in the chamber 2, and the force Ff from the fibre 7, so that $Ff = 2K3 \cdot \Delta L3 = Kf \cdot \Delta Lf$ hence $\Delta L3 = \Delta Lf \cdot Kf/2K3$.

The compressed first bellows 110, 120 will be subjected to the pressure P1 in the chamber 2 and the force Ff from the fibre 7, so that $2A \cdot \Delta P = 2K1 \cdot \Delta L1 + Ff = 2K1 \cdot \Delta L1 + Kf \cdot \Delta Lf$.

Simplifying again by assuming K1=K2=K, it follows that $\Delta L1 = \Delta L2 = \Delta L$, so that $2A \cdot \Delta P = 2K \cdot \Delta L + Kf \cdot \Delta Lf$, or $\Delta L = (2A \cdot \Delta P - Kf \cdot \Delta Lf)/2K$.

It further follows that $\Delta L3 = 2\Delta L - \Delta Lf = \Delta Lf \cdot Kf/2K3$, and that $2\Delta L = \Delta L3 + \Delta Lf = \Delta Lf \cdot Kf/2K3 + \Delta Lf$.

Thus: $2\Delta L = (2A \cdot \Delta P - Kf \cdot \Delta Lf)/K = \Delta Lf \cdot Kf/2K3 + \Delta Lf$ $2A \cdot \Delta P = (\Delta Lf \cdot Kf/2K3 + \Delta Lf) \cdot K + Kf \cdot \Delta Lf = \Delta Lf \cdot (K \cdot Kf/2K3 + K + Kf)$ $\Delta Lf = 2A \cdot \Delta P/(K \cdot Kf/2K3 + K + Kf)$ If K/K3>1, it will be appreciated that $\Delta Lf$ is much smaller as compared to the embodiment 1002 without static pressure compensation.

It can also be seen that the sensor in the embodiments 1002 and 1004 is quite robust against mechanical vibrations in the longitudinal direction within a streamer. Such vibrations will cause vibrations of the chamber 2 as a whole. If the first and second pressure-sensitive mounting assemblies 100 and 200 have identical physical properties, the first and second fibre mounts 130 and 230 will at all times move in the same direction with the same amplitude, so that the vibrations will not induce any length variations in the fibre.

In the above explanatory calculations, for sake of simplicity, temperature effects leading to pressure changes in the bellows 110, 120, 210, 220 have been ignored. The temperature of the gas filling in bellows 110, 120, 210, 220 may vary due to, for instance, variations in ambient temperature.

Although such changes could be relevant, the gist of the operation as explained above remains valid.

Figure 7:
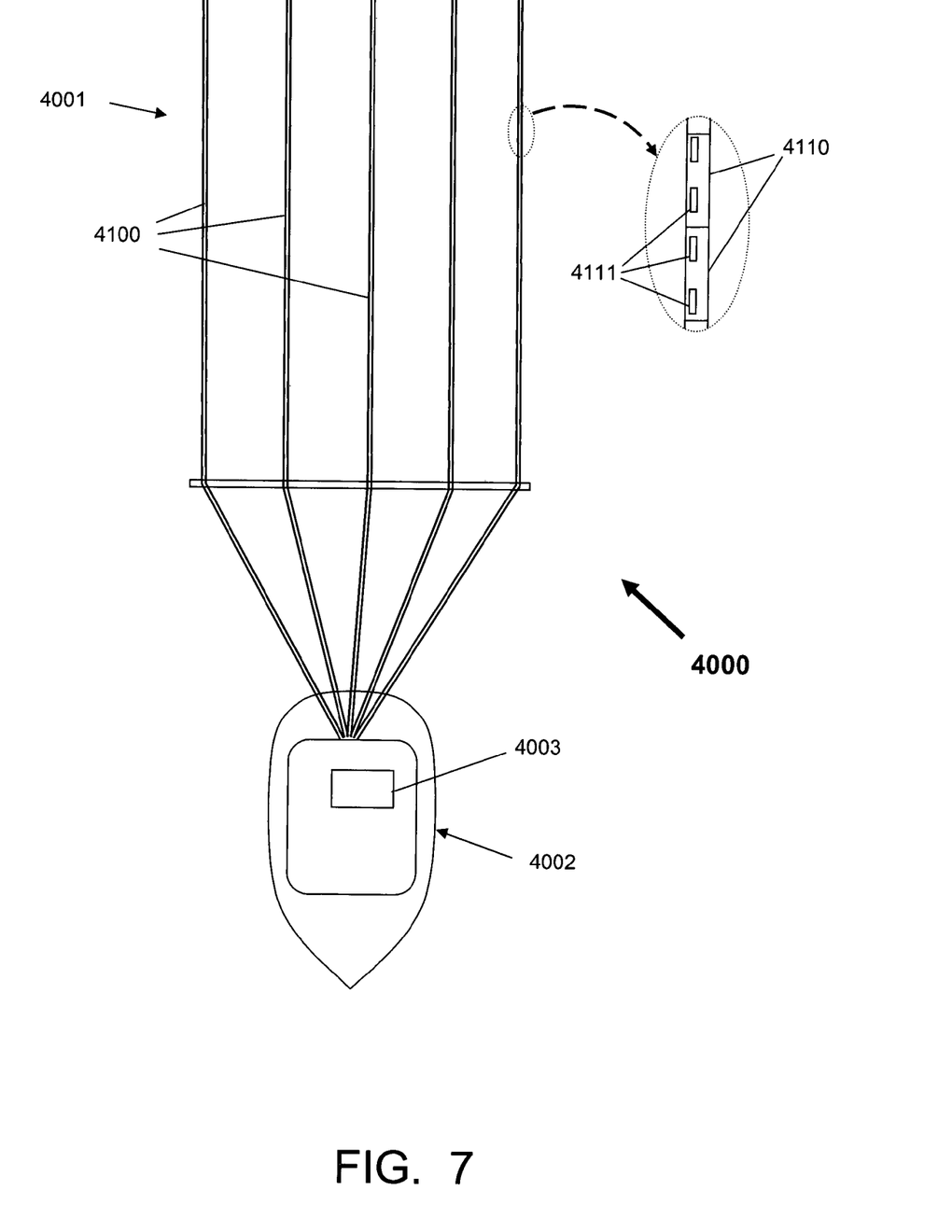
FIG. 7 schematically shows a seismic exploration system.

FIG. 7 schematically illustrates a seismic exploration system 4000 implemented in accordance with the present invention. The seismic exploration system 4000 comprises an array 4001 of cables 4100, indicated as "streamers". The array 4001 is towed by a ship 4002. The individual cables have mutual distances in the order of about 50 meters. Each cable 4100, which may have a length of several kilometers, may be one integral length of cable, but typically a cable will comprise a plurality of cable sections 4110 attached to each other so that it is easily possible to adapt the cable length. Each cable 4100 includes a plurality of sensors 4111 arranged along its length, with a mutual distance in the order of a few meters. Each cable section 4110 may include just one sensor 4111, or may include two or more sensors, as shown.

The sensors may all have mutually identical design, but that is not essential. For performing reflection seismology in a sea, acoustic pulses are generated at or close to the water surface, by acoustic pulse generator means which may be conventional and which are not shown for sake of simplicity. Reflected acoustic waves, which travel in the water as pressure waves, are detected by the pressure sensors 4111. Measuring signals from the sensors 4111 travel along the streamers 4100 to a processing apparatus 4003 located, in the embodiment shown, aboard the ship 4002.

It should be clear to a person skilled in the art that the present invention is not limited to the exemplary embodiments discussed above, but that several variations and modifications are possible within the protective scope of the invention as defined in the appending claims. For instance, the separate frame 10 may be omitted, or may be integral with the chamber 2, in which case the functional components of the sensor will be mounted and fixed with respect to the chamber 2. The presence of the separate frame 10 in any case facilitates the mounting of the components to the frame after which the assembled frame plus components will be mounted into the chamber. If, instead of a hard fixation, the frame 10 is weakly coupled to the chamber 2, vibration sensitivity can be further decreased.

Further, instead of the chamber 2 being filled with oil 3, another suitable liquid, gel, gas etc could be used.

Figure 5:
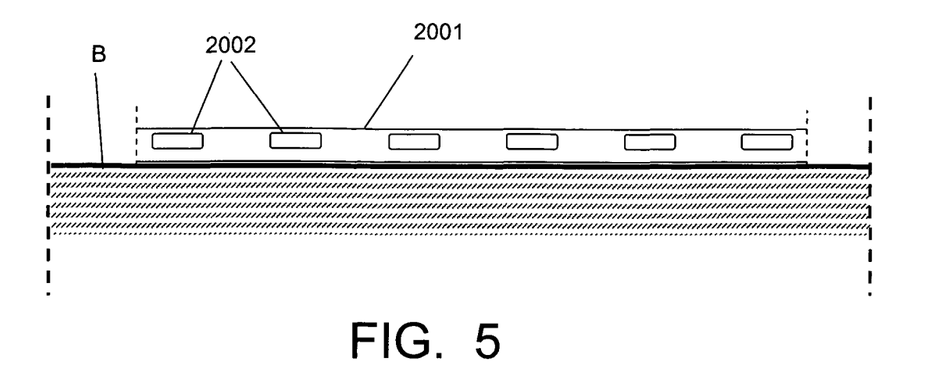
FIG. 5 schematically shows a cable comprising a plurality of sensors.

Further, while the desirability of the present invention has been explained in the above for the field of reflection seismology, the applicability of the sensor proposed by the present invention is not limited to this field. Basically, the sensor proposed by the present invention can be used in any application where it is desirable to sense pressure waves, notably acoustic pressure waves, in any wave-guiding medium. The nature of the wave-guiding medium is not essential, apart from the fact that the sensor should be able to couple with the medium for receiving the pressure waves. With reference to FIG. 5, in the context of water as wave-guiding medium, the pressure-sensing device of the present invention may for instance be advantageously applied in subsea pressure monitoring, either as spot monitoring or implemented as a cable 2001 lying on the sea floor B and comprising a plurality of sensors 2002, as contrasting a streamer towed by a ship. Such cable 2001 could also be used for subterranean pressure monitoring, for instance vertical seismic profiling. Vertical seismic profiling is for instance often done in oil extraction wells but can also be done in other fluid-filled holes drilled in the ground, i.e. sea floor or land.

Figure 6:
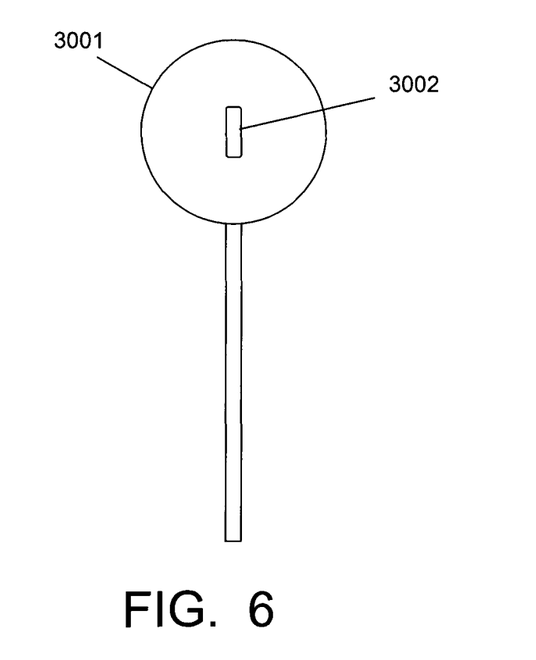
FIG. 6 schematically shows a microphone.

The pressure-sensing device of the present invention may also be used for detecting sound: FIG. 6 illustrates a microphone 3001 comprising at least one optical air pressure sensor device 3002 for detecting pressure waves in air.

Even if certain features are recited in different dependent claims, the present invention also relates to an embodiment comprising these features in common. Any reference signs in a claim should not be construed as limiting the scope of that claim.

The invention claimed is:

1. An optical pressure sensor device comprising:
   a chamber filled with a pressure transfer medium, the chamber being suitable for immersion in a fluid and having a window that is at least partly transparent to pressure waves in such fluid;
   an optical fiber extending longitudinally through the chamber, the optical fiber comprising a Fiber Bragg Grating;
   a frame having a first frame end and a longitudinally opposite second frame end; and
   a first pressure-sensitive mounting assembly arranged within the chamber and fixed to the first frame end, the first pressure-sensitive mounting assembly comprising:
      a first fiber mount displaceable in the longitudinal direction of the fiber; and
      an axial pressure response element interposed between the first fiber mount and the first frame end, adjacent the fiber;
   wherein the optical fiber is fixed to the first fiber mount at one fixing point at one side of the Fiber Bragg Grating; and
   wherein, at least in normal operation, the first fiber mount is exerting on the optical fiber a pulling force towards the first frame end, the pulling force being variable with variations in the pressure of the pressure transfer medium such that an increase in pressure effects an increase in pulling force.

2. The optical pressure sensor device according to claim 1, wherein the optical fiber is fixed to a second frame end opposite the first frame end, at a second fixing point at an opposite side of the Fiber Bragg Grating with respect to the first fixing point.

3. The optical pressure sensor device according to claim 1 further comprising:
   a second pressure-sensitive mounting assembly arranged within the chamber and fixed to the second frame end, the second pressure-sensitive mounting assembly comprising:
      a second fiber mount displaceable in the longitudinal direction of the fiber; and
      an axial pressure response element interposed between the second fiber mount and the second frame end, adjacent the fiber;
   wherein the optical fiber is fixed to the second fiber mount at a second fixing point at an opposite side of the Fiber Bragg Grating with respect to the first fixing point; and
   wherein, at least in normal operation, the second fiber mount is exerting on the optical fiber a second pulling force towards the second frame end, the second pulling force being variable with variations in the pressure of the pressure transfer medium such that an increase in pressure effects an increase in second pulling force.

4. The optical pressure sensor device according to claim 1 further comprising:
   a static pressure compensation assembly arranged within the chamber and fixed to the second frame end, the static pressure compensation assembly comprising:
      a second fiber mount displaceable in the longitudinal direction of the fiber; and an axial pressure compensation element interposed between the second fiber mount and the second frame end, adjacent the fiber;

wherein the optical fiber is fixed to the second fiber mount at a second fixing point at an opposite side of the Fiber Bragg Grating with respect to the first fixing point; and wherein the axial stiffness of the axial pressure compensation element is a function of the pressure of the pressure transfer medium such that the stiffness is high for high-frequency pressure variations and lower for low-frequency pressure variations and for static pressure conditions.

5. The optical pressure sensor device according to claim 1 further comprising:

a static pressure compensation assembly arranged within the chamber and fixed to the second frame end, the static pressure compensation assembly comprising an axial pressure compensation element arranged adjacent the fiber; and a second pressure-sensitive mounting assembly arranged within the chamber and fixed to the static pressure compensation assembly, the second pressure-sensitive mounting assembly comprising:

a second fiber mount displaceable in the longitudinal direction of the fiber; and an axial pressure response element interposed between the second fiber mount and the static pressure compensation assembly, adjacent the fiber;

wherein the optical fiber is fixed to the second fiber mount at a second fixing point at an opposite side of the Fiber Bragg Grating with respect to the first fixing point;

wherein, at least in normal operation, the second fiber mount is exerting on the optical fiber a second pulling force towards the second frame end, the second pulling force being variable with variations in the pressure of the pressure transfer medium such that an increase in pressure effects an increase in second pulling force; and wherein the axial stiffness of the axial pressure compensation element is a function of the pressure of the pressure transfer medium such that the stiffness is high for high-frequency pressure variations and lower for low-frequency pressure variations and for static pressure conditions.

6. The optical pressure sensor device according to claim 1 further comprising:

a second pressure-sensitive mounting assembly arranged within the chamber and fixed to the second frame end, the second pressure-sensitive mounting assembly comprising an axial pressure response element arranged adjacent the fiber; and a static pressure compensation assembly arranged within the chamber and fixed to the second pressure-sensitive mounting assembly, the static pressure compensation assembly comprising:

a second fiber mount displaceable in the longitudinal direction of the fiber; and an axial pressure compensation element interposed between the second fiber mount and the second pressure-sensitive mounting assembly, adjacent the fiber;

wherein the optical fiber is fixed to the second fiber mount at a second fixing point at an opposite side of the Fiber Bragg Grating with respect to the first fixing point;

wherein, at least in normal operation, the second fiber mount is exerting on the static pressure compensation assembly a second pulling force towards the second frame end, the second pulling force being variable with variations in the pressure of the pressure transfer medium such that an increase in pressure effects an increase in second pulling force; and wherein the axial stiffness of the axial pressure compensation element is a function of the pressure of the pressure transfer medium such that the stiffness is high for high-frequency pressure variations and lower for low-frequency pressure variations and for static pressure conditions.

7. The optical pressure sensor device according to claim 5 further comprising:

an intermediate mount, having one end fixed to the axial pressure compensation element of the static pressure compensation assembly and having its opposite end fixed to the second pressure response element of the second pressure-sensitive mounting assembly, the intermediate mount further having a passage allowing the fiber to pass without touching the intermediate mount.

8. The optical pressure sensor device according to claim 1 further comprising a static pressure compensation assembly interposed between the first frame end and the first pressure-sensitive mounting assembly.

9. The optical pressure sensor device according to claim 1, wherein the pressure response element is implemented as a bellow.

10. The optical pressure sensor device according to claim 1, wherein the pressure compensation element is implemented as a bellow.

11. The optical pressure sensor device according to claim 4, wherein the fiber has a stiffness Kf;

wherein the first pressure response element has a stiffness K1 smaller than Kf; and wherein the pressure compensation elements have static stiffnesses K3 smaller than K1.

12. The optical pressure sensor device according to claim 4, wherein the fiber has a stiffness Kf;

wherein the first and second pressure response elements have respective stiffnesses K1 and K2 smaller than Kf; and wherein the pressure compensation elements have static stiffnesses K3 smaller than K1 and K2.

13. The optical pressure sensor device according to claim 1, wherein the window is implemented as a membrane.

14. The optical pressure sensor device according to claim 1 comprising two or more pressure response elements that have mutually the same size and design, so that they have mutually the same physical properties.

15. The optical sensor device according to claim 1 comprising two or more pressure compensation elements that have mutually the same size and design, so that they have mutually the same physical properties.

16. A streamer section for seismic exploration comprising an optical pressure sensor device according to claim 1.

17. A streamer for seismic exploration comprising an optical pressure sensor device according to claim 1.

18. A streamer array comprising two or more streamers according to claim 17.

19. A seismic exploration system comprising:
a streamer according to claim 17;
a ship for towing the streamer; and
a processing apparatus for receiving and processing measuring signals from the sensor device.

20. A cable for subsea pressure monitoring of submarine acoustic detection comprising an optical pressure sensor device according to claim 1.

21. A microphone comprising an optical pressure sensor device according to claim 1.

22. A pressure-sensitive mounting assembly for an optical pressure sensor device according to claim 1, the pressure-sensitive mounting assembly comprising:
 a moveable fiber mount having a connection point for connecting to a fiber; and
 an axial pressure response element for coupling the fiber mount to a frame end such that the fiber mount is displaceable in an axial direction;
 wherein the axial pressure response element has one axial end for connecting to the frame end and has an opposite axial end connected to the fiber mount adjacent the connection point; and
 wherein, in the axial pressure response element, the axial dimension is responsive to changes in ambient pressure in that an increase in ambient pressure effects a decrease of the axial distance between the axial ends.

23. The pressure-sensitive mounting assembly according to claim 22, wherein the axial pressure response element comprises a closed container.

24. The pressure-sensitive mounting assembly according to claim 23, wherein the axial pressure response element comprises a bellows.

25. The pressure-sensitive mounting assembly according to claim 22, comprising two axial pressure response elements arranged at opposite sides of the connection point.

26. A static pressure compensation assembly for an optical pressure sensor device according to claim 1, the static pressure compensation assembly comprising:
 a moveable base; and
 an axial pressure compensation element for coupling the base to a frame end such that the base is displaceable in an axial direction;
 wherein the axial stiffness of the axial pressure compensation element is a function of the ambient pressure such that the stiffness is high for high-frequency pressure variations and lower for low-frequency pressure variations and for static pressure conditions.

27. The static pressure compensation assembly according to claim 26, wherein the axial pressure compensation element comprises a bellow having its interior in fluid communication with the ambient via a choke channel, the choke channel having a relatively high flow resistance for ambient fluid.

28. The static pressure compensation assembly according to claim 27, wherein the choke channel has a time constant in the order of about 1 second to 10 minutes.

29. A method for seismic exploration of a sea floor, the method comprising:
 providing an optical pressure sensor in accordance with claim 1;
 arranging the sensor in the sea;
 generating an acoustic pulse in an upper region of the sea;
 detecting acoustic response signals from the sea floor using the optical pressure sensor; and
 processing the measuring signals from the optical pressure sensor.

30. The method according to claim 29, wherein a plurality of optical pressure sensors are arranged in a streamer, and wherein the streamer is arranged in the sea and towed by a ship.

31. The method according to claim 30, wherein an array of multiple streamers are arranged in the sea and towed by the ship.

32. A method of detecting pressure variations in a fluid comprising:
 providing an optical fiber comprising a Fiber Bragg Grating;
 holding the optical fiber at two fixing points on opposite sides of the Fiber Bragg Grating;
 exerting on the optical fiber a tension force pulling the two fixing points apart;
 receiving a fluid pressure variation;
 in response to receiving a fluid pressure increase, increasing the tension force, and in response to receiving a fluid pressure decrease, decreasing the tension force;
 interrogating the optical fiber with a light pulse;
 receiving a reflected light pulse from the Fiber Bragg Grating;
 analyzing the wavelength spectrum of the reflected light pulse to calculate a length variation of the Fiber Bragg Grating proportional to a wavelength shift of the reflected light pulse as compared to the interrogating light pulse, and to calculate a pressure variation proportional to the length variation;
 filtering the fluid pressure variations; and
 reducing the tension force response variation for fluid pressure variations having a variation frequency lower than a predefined frequency threshold in order to effect static pressure variation compensation.

33. A detection means for detecting pressure variations in a fluid comprising:
 an optical fiber comprising a Fiber Bragg Grating;
 mounting means for holding the optical fiber at two fixing points on opposite sides of the Fiber Bragg Grating, and for exerting on the optical fiber a tension force pulling the two fixing points apart; and
 a compensation means;
 the mounting means including a pressure-sensitive response element for receiving a fluid pressure variation and for, in response to receiving a fluid pressure increase, increasing the tension force, and in response to receiving a fluid pressure decrease, decreasing the tension force; and
 the compensation means for reducing the tension force response variation for fluid pressure variations having a variation frequency lower than a predefined frequency threshold.

34. A cable for subterranean pressure monitoring comprising an optical pressure sensor device according to claim 1.

35. A method for subsea pressure monitoring of submarine acoustic detection, the method comprising:
 providing a cable in accordance with claim 20;
 laying the cable on a sea floor;
 detecting acoustic signals using the optical pressure sensor of the cable; and
 processing the measuring signals from the optical pressure sensor.

36. A method for subterranean pressure monitoring comprising:
 providing the cable in accordance with claim 20;
 arranging the cable in a fluid-filled hole drilled in the ground;
 detecting acoustic signals using the optical pressure sensor of the cable; and
 processing the measuring signals from the optical pressure sensor.

37. The method according to claim 36, wherein the method is for vertical seismic profiling.

38. The method according to claim 36, wherein the fluid-filled hole is an oil extraction well.

39. The optical pressure sensor device according to claim 1, wherein the pressure transfer medium comprises oil.

40. The static pressure compensation assembly according to claim 27, wherein the choke channel has a time constant in the order of about 1 minute.

\* \* \* \* \*